(No Model.)

J. F. PORTER.
EVAPORATING PAN.

No. 285,069. Patented Sept. 18, 1883.

WITNESSES
Jas. F. Duhamel
Walter S. Dodge

INVENTOR
John F. Porter,
by Dodge Son,
Attys.

UNITED STATES PATENT OFFICE.

JOHN F. PORTER, OF RED WING, MINNESOTA.

EVAPORATING-PAN.

SPECIFICATION forming part of Letters Patent No. 285,069, dated September 18, 1883.

Application filed June 14, 1883. (No model.)

*To all whom it may concern:*

Be it known that I, JOHN F. PORTER, of Red Wing, in the county of Goodhue and State of Minnesota, have invented certain Improvements in Evaporating-Pans, of which the following is a specification.

My invention relates to evaporating-pans such as are used in the manufacture of sugar; and it consists in constructing the same with partitions of successively greater height, dividing the pan into a series of compartments, one of which is provided with an overhanging shield or cover, and each of which is furnished with an independent internal steam pipe or coil along its bottom, for the purpose of affording the necessary heat and regulating the temperature in different compartments.

Figure 1:
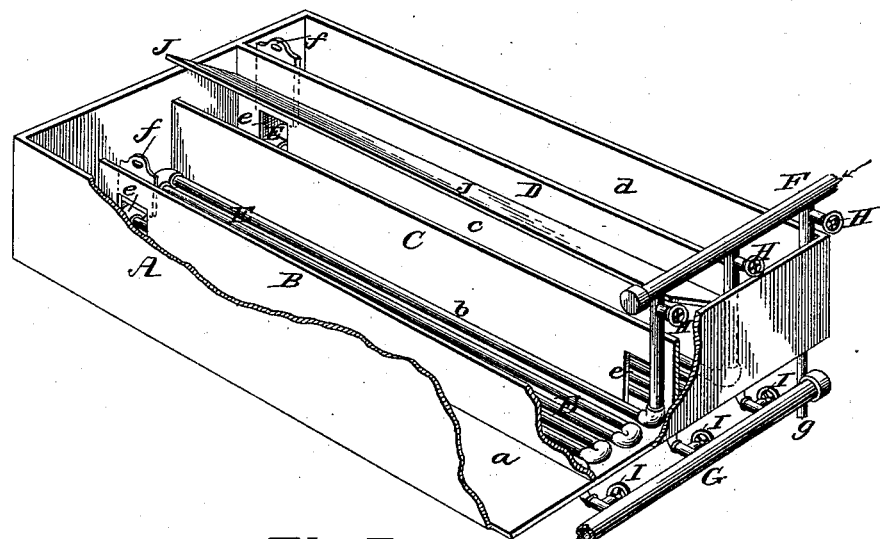
Figure 2:
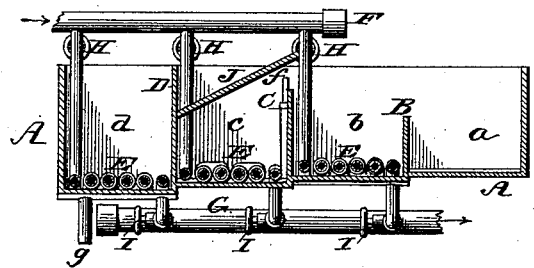
Figure 3:
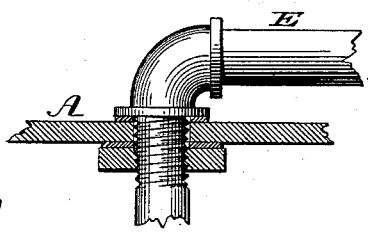

In the drawings hereto annexed, Figure 1 represents a perspective view of my improved pan; Fig. 2, a transverse central section through the same; Fig. 3, a sectional view, showing the coupling for securing the pipes in place.

This invention contemplates the use of steam heat instead of direct use of fire; and the improvements relate to means for regulating and controlling the temperature in different parts of the pan, according to the nature and condition of the material under treatment, the state of the weather, and like influencing considerations, and to a construction of the pan which shall cause the scum to be constantly thrown back toward the receiving side of the same.

In the accompanying drawings, A represents the pan as a whole, divided by a series of longitudinal partitions, B C D, into compartments *a*, *b*, *c*, and *d*, the flow of material being in a zigzag direction from one side of the pan to the other.

The partition B is usually made about three inches in height, partition C four inches, and partition D as high as the upper edge of the pan, the heights, however, being subject to variation, according to the other dimensions of the pan and like considerations, it being important, though, that the partitions be made successively higher, as mentioned, in order that the scum rising to the top may flow constantly backward over the top of the partitions to the receiving side.

Each partition is furnished at or near one end, at its bottom or lower edge, with a gateway or opening, *e*, controlled by a gate or slide, *f*, by which the size and height of the opening may be regulated, the openings of the respective partitions being placed alternately at opposite ends, to cause the liquid which passes through them to travel in a zigzag direction, beginning at one side of the pan and traveling along the respective compartments from end to end thereof, until the rear or delivery side of the pan is reached.

Each compartment *b*, *c*, and *d* contains a steam pipe or "manifold," E, each receiving steam from a supply-pipe, F, and discharging the spent steam, together with any water which may be present from condensation, into an exhaust-pipe, G.

The steam pipes or manifolds E are each furnished with valves or cocks H and I, by which the inlet and discharge of steam may be accurately regulated and controlled, so as to control the temperature in each compartment independently of the others. This is a feature of great importance, because, as the material becomes thick through evaporation, a difference of temperature is often required.

The steam pipes, coils, or manifolds are placed inside and upon or close to the bottoms of the compartments, so that the juice and sirup flowing through the pan come into contact with every portion of the surface of the pipes, and consquently take up the heat thereof to the fullest extent.

The pipes may be raised very slightly off the bottom of the pan to permit the juice to flow under them and prevent accumulation of sirup or sugar, the U-shaped couplings at the ends of the coils or pipes raising them sufficiently, however, for all ordinary purposes.

J indicates a guard or shield extending from the rear side of compartment *c* forward and upward at an angle toward the receiving side of the pan, terminating above partition B. This guard prevents the scum which rises to the top of the juice and sirup from flowing over partition D into compartment *d*, and directs it toward the receiving side of the pan, the successively lower partitions, C and B, permitting the scum to flow over them to the receiving-compartment *a*.

Each manifold, coil, or set of pipes E has one end or branch extended upward and connected with the supply-pipe F, and the other end or branch carried downward through the bottom of the pan and connected with the exhaust-steam pipe, suitable couplings being provided, as shown in Fig. 3, to permit the ready disconnection and removal of the coils for cleaning or renewal.

I am aware that it is not broadly new to employ a steam pipe or coil within an evaporating-pan, nor to make the partitions of successively greater height, and therefore I do not broadly claim these features; but I am not aware that such coils have heretofore been provided with means for regulating the temperature of each compartment of the pan independently of the others; nor am I aware that any one has hitherto combined with said feature the partitions of gradually-increasing height, or the guard or shield for directing the scum backward relatively to the direction in which the juice and sirup travel. Finally, I am aware that independent steam-jacketed receptacles have been proposed provided with valves, whereby the supply of steam could be cut off from any particular receptacle; and, also, that an evaporating-pan has been provided with a tubular steam-grate consisting of two heads connected by parallel pipes through which the steam might pass from one head to the other, and such constructions I do not claim. By my construction the steam is caused to pass equally through every part of each coil or manifold, and consequently to heat all parts of the compartment alike—a feature of great importance in the treatment of sirup. The raw juice enters compartment $a$ at one end, flows to the farther end, and there passes through opening $e$ to compartment $b$, and in the same manner traverses the compartments $b$ and $c$ until it finally enters the compartment $d$, substantially free from scum and impurities, and is finally drawn off through discharge-outlet $g$.

The number of compartments may be increased, if desired, though in practice four are found to answer well. I prefer also to make the pan longest in the direction of the length of the compartments, instead of at right angles thereto, as is the more general custom.

The bottom of each compartment has a fall of about one inch and a half in fifteen feet, in order to insure the proper flow of the sirup from end to end.

Having thus described my invention, what I claim is—

1. The herein-described evaporating apparatus, consisting of pan or vessel A, having partitions B C D, of successively greater height, dividing the pan into compartments $a$, $b$, $c$, and $d$, independent steam-pipes E in the respective compartments, each provided with a valve for regulating the flow of steam, and shield or guard J, projecting over compartment $c$, all substantially as shown and described.

2. In an evaporating-pan provided with a series of communicating compartments, a series of independent steam pipes or manifolds arranged one in each compartment, and each furnished with a valve, whereby the flow of steam throughout may be regulated and controlled.

3. An evaporating-pan, A, divided into communicating compartments by a series of partitions of successively greater height, and a guard or shield, J, overhanging one of said compartments from end to end, substantially as shown and described, and for the purpose set forth.

4. In combination with pan A, having a series of compartments, substantially as shown, a series of independent coils or pipes, E, located in the respective compartments, each provided with valves H and I, and connected at one end with supply-pipe F and at the other end with exhaust-pipe G, substantially as shown and described.

5. In combination with pan A, divided into compartments, as shown, a series of independent removable steam pipes or coils, each connected with the supply and exhaust pipes by couplings, substantially such as shown and described, whereby any one or more of said coils may be removed without disturbing the others.

JOHN F. PORTER.

Witnesses:
F. JOSS,
W. C. WILLISTON.